United States Patent
Kino

(10) Patent No.: US 10,321,062 B2
(45) Date of Patent: Jun. 11, 2019

(54) IMAGE PICKUP APPARATUS, NON-TRANSITORY COMPUTER-READABLE MEDIUM STORING COMPUTER PROGRAM, AND IMAGE PICKUP METHOD FOR CONTROLLING THE LUMINANCE AT WHICH A LIVE VIEW IMAGE IS DISPLAYED

(71) Applicant: Olympus Corporation, Hachioji-shi, Tokyo (JP)

(72) Inventor: Tatsuya Kino, Kodaira (JP)

(73) Assignee: Olympus Corporation, Tokyo (JP)

( * ) Notice: Subject to any disclaimer, the term of this patent is extended or adjusted under 35 U.S.C. 154(b) by 91 days.

(21) Appl. No.: 15/491,666

(22) Filed: Apr. 19, 2017

(65) Prior Publication Data

US 2017/0374288 A1    Dec. 28, 2017

(30) Foreign Application Priority Data

Jun. 27, 2016   (JP) ................................ 2016-126958

(51) Int. Cl.
*H04N 5/232* (2006.01)
*H04N 5/235* (2006.01)
*H04N 5/243* (2006.01)

(52) U.S. Cl.
CPC ....... *H04N 5/23293* (2013.01); *H04N 5/2351* (2013.01); *H04N 5/2353* (2013.01); *H04N 5/23245* (2013.01); *H04N 5/243* (2013.01)

(58) Field of Classification Search
CPC .......... H04N 5/23293; H04N 5/23245; H04N 5/2351; H04N 5/2353; H04N 5/243
See application file for complete search history.

(56) References Cited

U.S. PATENT DOCUMENTS 9,008,352 B2 *  4/2015  Oshima ................. H04N 5/445
                                                    382/100
9,100,599 B2 *  8/2015  Kubota ............... H04N 5/2352

FOREIGN PATENT DOCUMENTS

JP    2013-118463    6/2013

* cited by examiner

*Primary Examiner* — Padma Haliyur
(74) *Attorney, Agent, or Firm* — John C. Pokotylo; Pokotylo Patent Services

(57) ABSTRACT

An image pickup apparatus includes an image pickup section configured to shoot a live view image between shooting periods of two continuous still images in continuous shooting, a display section configured to display a live view image in a live view display period and display a black image in another period, and a display luminance change section configured to calculate a during-continuous-shooting display luminance value larger than a normal display luminance value to change luminance of the live view image.

10 Claims, 12 Drawing Sheets

IMAGE PICKUP APPARATUS, NON-TRANSITORY COMPUTER-READABLE MEDIUM STORING COMPUTER PROGRAM, AND IMAGE PICKUP METHOD FOR CONTROLLING THE LUMINANCE AT WHICH A LIVE VIEW IMAGE IS DISPLAYED

CROSS REFERENCE TO RELATED APPLICATION

This application claims benefit of Japanese Application No. 2016-126958 filed in Japan on Jun. 27, 2016, the entire contents of which are incorporated herein by this reference.

BACKGROUND OF THE INVENTION

1. Field of the Invention

The present invention relates to an image pickup apparatus which shoots and displays a live view (LV) image during an interval of still image shooting in continuous shooting while displaying a black image during the still image shooting, a non-transitory computer-readable medium storing a computer program, and an image pickup method.

2. Description of the Related Art

In an image pickup apparatus such as an electronic camera, examples of a system for displaying an image of an object while continuous shooting is being performed (during continuous shooting) include a REC VIEW system (REC VIEW continuous shooting) and a live view system (live view continuous shooting). The REC VIEW system is a system for reducing and displaying a still image for recording obtained by subjecting an image pickup device to all-pixels readout driving (hereinafter referred to as still driving). The live view system is a system for displaying a live view image obtained by subjecting an image pickup device to addition/thinning readout driving (at least one of addition readout driving and thinning readout driving, and hereinafter referred to as through image driving) between a period during which a still image is shot and a period during which a subsequent still image is shot.

In the REC VIEW continuous shooting, the number of continuous shooting frames per unit time is easily increased because a driving mode need not be switched. However, the number of pixels composing a still image obtained by the still driving is larger than the number of pixels composing a live view image obtained by the through image driving. Thus, the REC VIEW continuous shooting requires a time period after image data starts to be read out since one still image finished being exposed until the image data finishes being read out, and further image processing also requires a time period, leading to an increase in a delay time period of display delay (latency). The REC VIEW continuous shooting is not suited to shooting a moving object while following the object because smooth movement cannot be displayed if a continuous shooting speed (the number of continuous shooting frames per unit time) is low.

On the other hand, in the live view continuous shooting, the number of readout pixels is small, and thus display delay (latency) is smaller than in the REC VIEW continuous shooting. However, a period during which a still image is being shot becomes a missing period during which a live view image cannot be acquired (in the REC VIEW continuous shooting, such a missing period does not occur because a reduced image of a still image finally obtained continues to be displayed until a reduced image of a subsequent still image is obtained). Therefore, a technique for displaying a black image as a dummy image in this missing period has been conventionally proposed. Generally, on the brain of a person, an action of interpolating movement of an object when a live view image has been being displayed within a person's brain is said to be exerted even after live view image display is switched to black image display. Thus, when the black image is displayed instead of a live view image finally obtained continuing to be displayed, the live view image can be observed as if continuous. Therefore, the movement of the object is felt smooth. Thus, when the moving object is shot while being followed, the live view continuous shooting in which display delay is small and movement is felt smooth is more appropriate than the REC VIEW continuous shooting.

However, in a method for alternately displaying a black image and a live view image for a person to sense brightness of an image using an integral value in the case of a display rate such as 30 fps or 60 fps, the image is felt dark. To cite an example, if the number of display frames composing the black image and the number of display frames composing the live view image are the same, the image is felt as if brightness of the image were reduced almost by half.

On the other hand, Japanese Patent Application Laid-Open Publication No. 2013-118463 discusses a technique for displaying not a black image but a gray image having a luminance level determined based on an average luminance of preceding images as a dummy image in a missing period, described above, in live view continuous shooting to improve brightness of an image sensed by a person.

SUMMARY OF THE INVENTION

According to an aspect of the present invention, there is provided, in an image pickup apparatus capable of performing continuous shooting for continuously acquiring a plurality of still images, the image pickup apparatus, including an image pickup section configured to shoot a live view image, which is read out in a shorter time period than each of the still images, in a live view shooting period between respective shooting periods of two continuous still images at the time of the continuous shooting, a display section configured to display the live view image acquired during the live view shooting period in a live view display period, and display a black image during a period other than the live view display period at the time of the continuous shooting, and a display luminance change section configured to calculate a during-continuous-shooting display luminance value larger than a normal display luminance value calculated based on a normal setting condition and change luminance of the live view image displayed on the display section based on the during-continuous-shooting display luminance value to suppress a decrease in visual luminance caused by the display during the live view display period and the display during the period other than the live view display period being alternately performed at the time of the continuous shooting.

According to another aspect of the present invention, there is provided a non-transitory computer-readable medium storing a computer program, the computer program being an image pickup program for causing a computer in an image pickup apparatus to perform continuous shooting for continuously acquiring a plurality of still images, the image pickup program including an image pickup step of shooting a live view image, which is read out in a shorter time period than each of the still images, in a live view shooting period between respective shooting periods of two continuous still images at the time of the continuous shooting, a display step of displaying the live view image acquired during the live view pickup period in a live view display period, and displaying a black image during a period other than the live view display period at the time of the continuous shooting, and a display luminance change step of calculating a during-continuous-shooting display luminance value larger than a normal display luminance value calculated based on a normal setting condition and changing luminance of the live view image displayed in the display step based on the during-continuous-shooting display luminance value to suppress a decrease in visual luminance caused by the display during the live view display period and the display during the period other than the live view display period being alternately performed at the time of the continuous shooting.

According to still another aspect of the present invention, there is provided an image pickup method for performing continuous shooting for continuously acquiring a plurality of still images, the method including an image pickup step of shooting a live view image, which is read out in a shorter time period than each of the still images, in a live view shooting period between respective shooting periods of two continuous still images at the time of the continuous shooting, a display step of displaying the live view image acquired during the live view shooting period in a live view display period, and displaying a black image during a period other than the live view display period at the time of the continuous shooting, and a display luminance change step of calculating a during-continuous-shooting display luminance value larger than a normal display luminance value calculated based on a normal setting condition and changing luminance of the live view image displayed in the display step based on the during-continuous-shooting display luminance value to suppress a decrease in visual luminance caused by the display during the live view display period and the display during the period other than the live view display period being alternately performed at the time of the continuous shooting.

DETAILED DESCRIPTION OF THE PREFERRED EMBODIMENTS

Embodiments of the present invention will be described below with reference to the drawings.

First Embodiment

Figure 1:
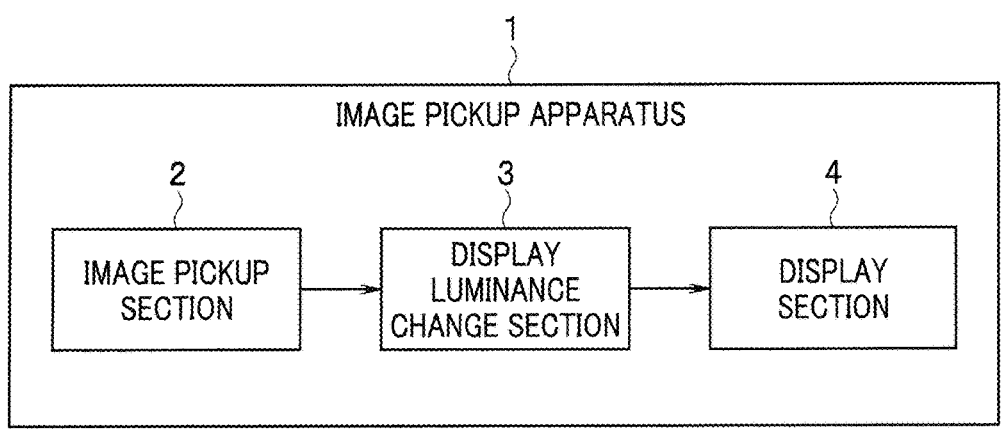
FIG. 1 is a block diagram illustrating a basic configuration of an image pickup apparatus according to a first embodiment of the present invention.

FIGS. 1 to 7 illustrate a first embodiment of the present invention, where FIG. 1 is a block diagram illustrating a basic configuration of an image pickup apparatus 1.

The image pickup apparatus 1 is configured to be able to perform continuous shooting for continuously acquiring a plurality of still images, and includes an image pickup section 2, a display luminance change section 3, and a display section 4.

The image pickup section 2 picks up, in a live view shooting period between respective shooting periods of two continuous still images, a live view image (also referred to as a through image) which is read out in a shorter time period than the still image at the time of continuous shooting.

The display section 4 displays the live view image acquired during the live view shooting period in a live view display period and displays a black image during a period other than the live view display period at the time of the continuous shooting. The display section 4 has a display characteristic which can be changed by changing a display setting value, for example. The display setting value, which can be changed, includes at least one of an illumination luminance value (e.g., a back light luminance value or a front light luminance value) of the display section 4 and a display gradation characteristic value (e.g., a display gamma characteristic value) of the display section 4.

The display luminance change section 3 calculates a during-continuous-shooting display luminance value larger than a normal display luminance value calculated based on a normal setting condition and changes luminance of the live view image displayed on the display section 4 based on the during-continuous-shooting display luminance value to suppress a decrease in visual luminance caused by the display during the live view display period and the display during the period other than the live view display period being alternately performed at the time of the continuous shooting.

More specifically, the display luminance change section 3 in the present embodiment calculates the during-continuousshooting display luminance value so that the during-continuous-shooting display luminance value increases as an image disappearance ratio representing a ratio of a period during which the black image is displayed to a continuous shooting period increases.

Furthermore, the display luminance change section 3 in the present embodiment calculates the during-continuous-shooting display luminance value so that the during-continuous-shooting display luminance value approaches the normal display luminance value as a continuous shooting rate representing the number of still images acquired per unit time decreases.

Note that the display luminance change section 3 may change the luminance of the live view image by setting the display setting value based on the during-continuous-shooting display luminance value or changing image data of the live view image outputted to the display section 4 based on the during-continuous-shooting display luminance value. In the latter case, the image data is changed by at least one of a change in a target exposure value in acquiring the image data, a change in an exposure correction amount in acquiring the image data, a change in a gradation conversion characteristic for the image data, and a change in a gain value for the image data.

Figure 2:
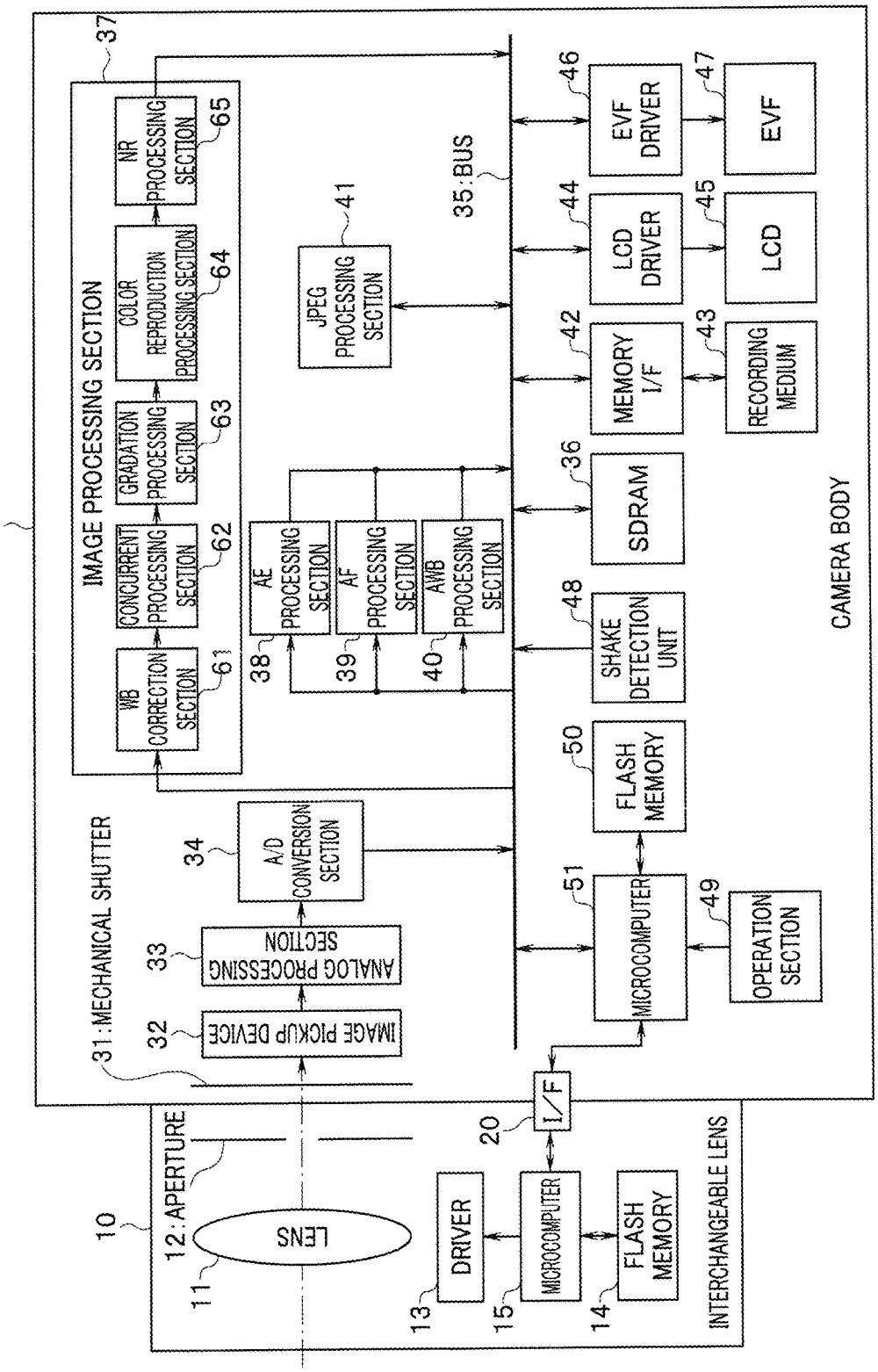
FIG. 2 is a block diagram illustrating an example of a configuration at the time when the image pickup apparatus according to the first embodiment is applied to a digital camera.

Then, FIG. 2 is a block diagram illustrating an example of a configuration at the time when the image pickup apparatus 1 is applied to a digital camera. Note that, while the digital camera is described as an example of the image pickup apparatus 1, the present invention is not limited to this. The image pickup apparatus 1 may be any apparatus if the apparatus has an image pickup function.

The digital camera in the example illustrated in FIG. 2 is an interchangeable lens camera, and is configured by connecting an interchangeable lens 10 and a camera body 30 to be communicable via an interface (I/F) 20.

The interchangeable lens 10 is removably mounted on the camera body 30 with a lens mount interposed therebetween, for example. An electric contact formed in the lens mount (an electric contact provided on the side of the interchangeable lens 10 and an electric contact provided on the side of the camera body 30), for example, constitute the interface 20.

The interchangeable lens 10 includes a lens 11, an aperture 12, a driver 13, a flash memory 14, and a microcomputer 15.

The lens 11 is an image pickup optical system for forming an optical image of an object on an image pickup device 32, to be described below, in the camera body 30.

The aperture 12 is an optical aperture configured to control a passage range of an optical bundle directed toward the image pickup device 32 from the lens 11.

The driver 13 drives the lens 11 based on an instruction from the microcomputer 15 to adjust a focus position, and also further changes a focal length when the lens 11 is a power zoom lens, for example. In a case of an image pickup apparatus having a fixed focal position, for example, a digital microscope that does not include the lens 11 configured to change a point of focus, a stage (not illustrated) to which an object is fixed is moved to adjust a distance between a taking lens and the object, to adjust an in-focus position. In addition, the driver 13 drives the aperture 12 to change an opening diameter based on the instruction from the microcomputer 15. When the aperture 12 is driven, brightness of the optical image of the object changes, and the size of a blur, for example, also changes.

The flash memory 14 is a storage medium configured to store a control program executed by the microcomputer 15 and various types of information on the interchangeable lens 10.

The microcomputer 15 is a so-called lens-side computer, and is connected to the driver 13, the flash memory 14, and the interface 20. The microcomputer 15 communicates with a microcomputer 51 serving as a computer on the body side, to be described below, via the interface 20, and reads/writes information stored in the flash memory 14 upon receipt of the instruction from the microcomputer 51, to control the driver 13. Further, the microcomputer 15 transmits various types of information on the interchangeable lens 10 to the microcomputer 51.

The interface 20 connects the microcomputer 15 in the interchangeable lens 10 and the microcomputer 51 in the camera body 30 to be bidirectionally communicable.

Then, the camera body 30 includes a mechanical shutter 31, an image pickup device 32, an analog processing section 33, an analog-to-digital conversion section (A/D conversion section) 34, a bus 35, a SDRAM (static random access memory) 36, an image processing section 37, an AE (automatic exposure) processing section 38, an AF (automatic focus) processing section 39, an AWB (automatic white balance) processing section 40, a JPEG (joint photographic experts group) processing section 41, a memory interface (memory I/F) 42, a recording medium 43, an LCD (liquid crystal display) driver 44, an LCD 45, an EVF (electronic view finder) driver 46, an EVF 47, a shake detection unit 48, an operation section 49, a flash memory 50, and a microcomputer 51.

The mechanical shutter 31 controls a time period elapsed until a light flux from the lens 11 reaches the image pickup device 32, and is an optical shutter configured to travel a shutter blade having a light shielding function, for example. The mechanical shutter 31 is driven in response to the instruction from the microcomputer 51, to control a time period elapsed until the light flux finishes reaching the image pickup device 32 after starting to reach the image pickup device 32, i.e., a time period required to expose the image pickup device 32.

The image pickup device 32 has a plurality of pixels arrayed in a two-dimensional manner at a predetermined pixel pitch on an image pickup surface, and receives the light flux incident from the lens 11 via the aperture 12 and performs image pickup (i.e., photoelectrically converts the formed optical image of the object) to generate an analog image signal based on control by the microcomputer 51 serving as an image pickup control section.

The image pickup device 32 in the present embodiment is configured as a single plate image pickup device in which color filters in a primary color Bayer array (R (red) G (green) B (blue) Bayer array) are arranged on a front surface of the plurality of pixels arrayed in a vertical direction and a horizontal direction, for example. Note that the image pickup device 32 is not limited to the single plate image pickup device, and may be a stacked image pickup device configured to separate color components in a thickness direction of a substrate, for example.

Furthermore, the image pickup device 32 is configured to be able to perform all-pixels readout driving for reading out respective pixel signals at all pixels and outputting the pixels and addition/thinning readout driving for performing at least one of addition of a plurality of pixels and thinning of the pixels within the image pickup device 32 and outputting the pixels to reduce the number of readout pixels.

Usually, the all-pixels readout driving is performed when still image data for recording is obtained, and the addition/thinning readout driving is performed when a live view image (through image) is obtained or movie data for recording is obtained, for example. Thus, the all-pixels readout driving and the addition/thinning readout driving are respectively hereinafter referred to as still driving and through image driving. Thus, the number of pixels composing the through image obtained by the through image driving is smaller than the number of pixels composing the still image obtained by the still driving. Therefore, a time period required to read out the through image is shorter than a time period required to read out the still image, and a time period required to image-process the through image is also shorter than a time period required to image-process the still image.

The analog processing section 33 performs waveform shaping after reducing reset noise or the like for an analog image signal read out of the image pickup device 32, and further performs gain-up for the analog image signal to have intended brightness.

The A/D conversion section 34 converts the analog image signal outputted from the analog processing section 33 into a digital image signal (referred to as image data, as needed).

For example, the image pickup device 32, the analog processing section 33, and the A/D conversion section 34 correspond to the image pickup section 2 illustrated in FIG. 1. However, the present invention is not limited to this. From the image pickup section 2, the A/D conversion section 34 may be excluded, or the analog processing section 33 and the A/D conversion section 34 may be excluded. Alternatively, the image pickup section 2 may be considered to further include the interchangeable lens 10 in addition to the image pickup device 32, the analog processing section 33, and the A/D conversion section 34.

While an example in which the image pickup device 32 is an analog image pickup device, and the analog processing section 33 and the A/D conversion section 34 are provided outside the image pickup device 32 is illustrated, the image pickup device 32 is configured to include the analog processing section 33 and the A/D conversion section 34 thereinside when a digital image pickup device which has spread in recent years.

The bus 35 is a transfer path for transferring various types of data and control signals generated in a certain location within the image pickup apparatus 1 to another location within the image pickup apparatus 1. The bus 35 in the present embodiment is connected to the A/D conversion section 34, the SDRAM 36, the image processing section 37, the AE processing section 38, the AF processing section 39, the AWB processing section 40, the JPEG processing section 41, the memory I/F 42, the LCD driver 44, the EVF driver 46, the shake detection unit 48, and the microcomputer 51.

The image data (hereinafter referred to as RAW image data, as needed) outputted from the A/D conversion section 34 is transferred via the bus 35, and is stored once in the SDRAM 36.

The SDRAM 36 is a storage section temporarily storing various types of data such as the aforementioned RAW image data or image data processed by the image processing section 37, the JPEG processing section 41.

The image processing section 37 performs various types of image processing for the RAW image data, and includes a WB (white balance) correction section 61, a concurrent processing section 62, a gradation processing section 63, a color reproduction processing section 64, and an NR (noise reduction) processing section 65.

The WB correction section 61 performs white balance processing for the image data so that a white-colored object is observed as white.

The concurrent processing section 62 performs demosaicking processing for interpolating, from image data in an RGB Bayer array in which only one of R, G, and B components exists for each of pixels, the color component not existing at a pixel of interest from the pixels in the neighborhood of the pixel of interest, to convert the image data into image data in which all R, G, and B components exist at each of all the pixels.

The gradation processing section 63 performs gradation conversion processing for correction (e.g., γ conversion processing) so that an image is displayed according to an appropriate gradation characteristic when displayed on the LCD 45, the EVF 47, an external monitor, or the like. A final tone of image data for display or recording is determined by the gradation conversion processing in the gradation processing section 63.

The color reproduction processing section 64 performs processing for more faithfully reproducing the color of the object by performing color matrix calculation for the image data.

The NR processing section 65 performs noise reduction processing by performing coring processing or the like corresponding to a spatial frequency for the image data.

Thus, image data obtained after the image processing section 37 has performed the various types of processing is stored again in the SDRAM 36.

The AE processing section 38 calculates an exposure evaluation value (e.g., an object luminance value BV) representing brightness of an image based on the RAW image data. The AE processing section 38 determines a shooting condition/exposure condition (e.g., a shutter speed TV, an aperture value AV, and a sensitivity SV) using a program diagram based on APEX (additive system of photographic exposure) or the like so that the calculated evaluation value becomes a previously determined target exposure value (target AE value). The microcomputer 51 performs AE control, i.e., control of the aperture 12, control of the mechanical shutter 31, or exposure timing control of the image pickup device 32 (control of a so-called electronic shutter), or control of a gain by the analog processing section 33, for example, based on the shooting condition/exposure condition determined by the AE processing section 38. Note that the AE processing section 38 determines, when exposure correction is set by a user, the shooting condition/exposure condition by adding the set exposure correction amount.

The AF processing section 39 extracts a signal having a high frequency component from the RAW image data, to acquire an in-focus evaluation value by AF integration processing. The acquired in-focus evaluation value is used for AF driving of the lens 11. Note that "AF" is not only limited to such contrast AF but also phase difference AF performed using a dedicated AF sensor (or pixels for AF on the image pickup device 32), for example.

The AWB processing section 40 performs auto white balance processing for detecting a color balance of the object based on the RAW image data, respectively calculating gains respectively corresponding to the R, G, and B components, and respectively multiplying the RGB components by the calculated gains to adjust a white balance.

The JPEG processing section 41 reads out the image data from the SDRAM 36, compresses the read image data according to a JPEG compression system to generate JPEG image data, and stores the generated JPEG image data in the SDRAM 36 in recording the image data. The JPEG image data stored in the SDRAM 36 is recorded as a JPEG file on the recording medium 43 via the memory I/F 42 after a header or the like is added to the JPEG file by the microcomputer 51.

The JPEG processing section 41 also decompresses the compressed image data. That is, when a recorded image is reproduced, a JPEG file, for example, is read out of the recording medium 43 via the memory I/F 42, and is stored once in the SDRAM 36 based on the control by the microcomputer 51. The JPEG processing section 41 decompresses the JPEG image data in the JPEG file stored in the SDRAM 36 according to a JPEG decompression system, and stores the decompressed image data in the SDRAM 36.

The memory I/F 42 is a recording control section configured to perform control to record the image data on the recording medium 43 and is also a readout control section configured to read out the image data from the recording medium 43.

The recording medium 43 is a recording section storing the image data in a nonvolatile manner, and includes a memory card detachably attached to the camera body 30, for example. However, the recording medium 43 is not limited to a memory card, and may be a disk-shaped recording medium or any other recording media. Therefore, the recording medium 43 need not have a configuration specific to the image pickup apparatus 1.

The LCD driver 44 reads out the image data stored in the SDRAM 36, converts the read image data into a video signal, and controls driving of the LCD 45 to display an image based on the video signal on the LCD 45.

The LCD 45 is a display panel provided on a back surface of the camera body 30, for example, and controls driving of the LCD driver 44, as described above, to display an image while displaying various types of information on the image pickup apparatus 1.

The EVF driver 46 reads out the image data stored in the SDRAM 36, converts the read image data into a video signal, and controls driving of the EVF 47 to display an image based on the video signal on the EVF 47.

The EVF 47 is configured to observe a display panel via an enlargement optical system in an upper part of the back surface of the camera body 30, for example, and controls driving of the EVF driver 46, as described above, to display an image while displaying various types of information on the image pickup apparatus 1.

Both the LCD 45 and the EVF 47 perform display by being subjected to application of a display gradation characteristic (e.g., a display gamma characteristic) serving as a display tone setting for an input image after turning on a back light, a front light, or the like at a previously set illumination luminance value (e.g., a back light luminance value or a front light luminance value). The illumination luminance value and the display gradation characteristic can be changed according to the setting.

The LCD 45 and the EVF 47 correspond to the display section 4 illustrated in FIG. 1, and the user can desirably select on which of the LCD 45 and the EVF 47 display is performed.

Examples of the image display performed by the LCD 45 or the EVF 47 include REC VIEW display for displaying image data of a still image immediately after shooting only for a short time period, reproduction display of the JPEG file recorded on the recording medium 43, reproduction display of a movie recorded on the recording medium 43, and live view display.

The shake detection unit 48 is a shake detection section including a gyro sensor, and detects the magnitude of movement of the image pickup apparatus 1 due to a camera shake by the user, for example, as a shake amount, for example. The shake detection unit 48 outputs a detection result to the microcomputer 51. The shake amount detected by the shake detection unit 48 is used as a camera shake warning to the user, or is used for image stabilization by an image stabilization mechanism (not illustrated).

The operation section 49 is used for performing various types of operation inputs to the image pickup apparatus 1, and includes a power button for turning on/off power to the image pickup apparatus 1, a release button constituted by a two-stage operation button including a 1st (first) release switch and a 2nd (second) release switch, for example, for issuing an instruction to start to shoot an image, a reproduction button for reproducing a recorded image, a menu button for performing a setting of the image pickup apparatus 1, for example, and an operation button such as a cross key used for a selection operation of items and an OK button used for a finalization operation of the selection item. Items, which can be set using the menu button, the cross key, the OK button, and the like, include a shooting mode (a single shooting mode, a continuous shooting mode, etc.), a recording mode (a JPEG recording mode, a RAW+JPEG recording mode, etc.), a reproduction mode, and various types of parameter settings. When operation is performed to the operation section 49, a signal corresponding to an operation content is outputted to the microcomputer 51. When the camera is set to the continuous shooting mode, for example, if the release button continues to be pressed, continuous shooting is performed by repeatedly shooting a still image while the 2nd release switch is turned on.

The flash memory 50 is a storage medium configured to store a processing program executed by the microcomputer 51 and various types of information on the image pickup apparatus 1 in a non-volatile manner. Some examples of the information stored by the flash memory 50 include a parameter used for image processing, a model name and a manufacturing number for specifying the image pickup apparatus 1, and a setting value set by the user. The information stored by the flash memory 50 is read by the microcomputer 51.

The microcomputer 51 is a control section configured to control each of sections in the camera body 30 while controlling the interchangeable lens 10 by transmitting an instruction to the microcomputer 15 via the interface 20 and integrally control the image pickup apparatus 1. The microcomputer 51 reads a parameter required for processing from the flash memory 50 according to the processing program stored in the flash memory 50 when the user performs the operation input from the operation section 49, to perform various types of sequences corresponding to the operation content.

The microcomputer 51 serving as a control section also functions as an image pickup control section configured to cause the image pickup device 32 to pick up an image to acquire image data in an image pickup mode. Particularly when the shooting mode is set to the continuous shooting mode, the microcomputer 51 functions as a continuous shooting control section configured to cause the image pickup device 32 to continuously shoot the still image when the 2nd release switch is maintained in an on state while shooting the live view image in the live view shooting period between the respective shooting periods of two continuous still images.

Figure 3:
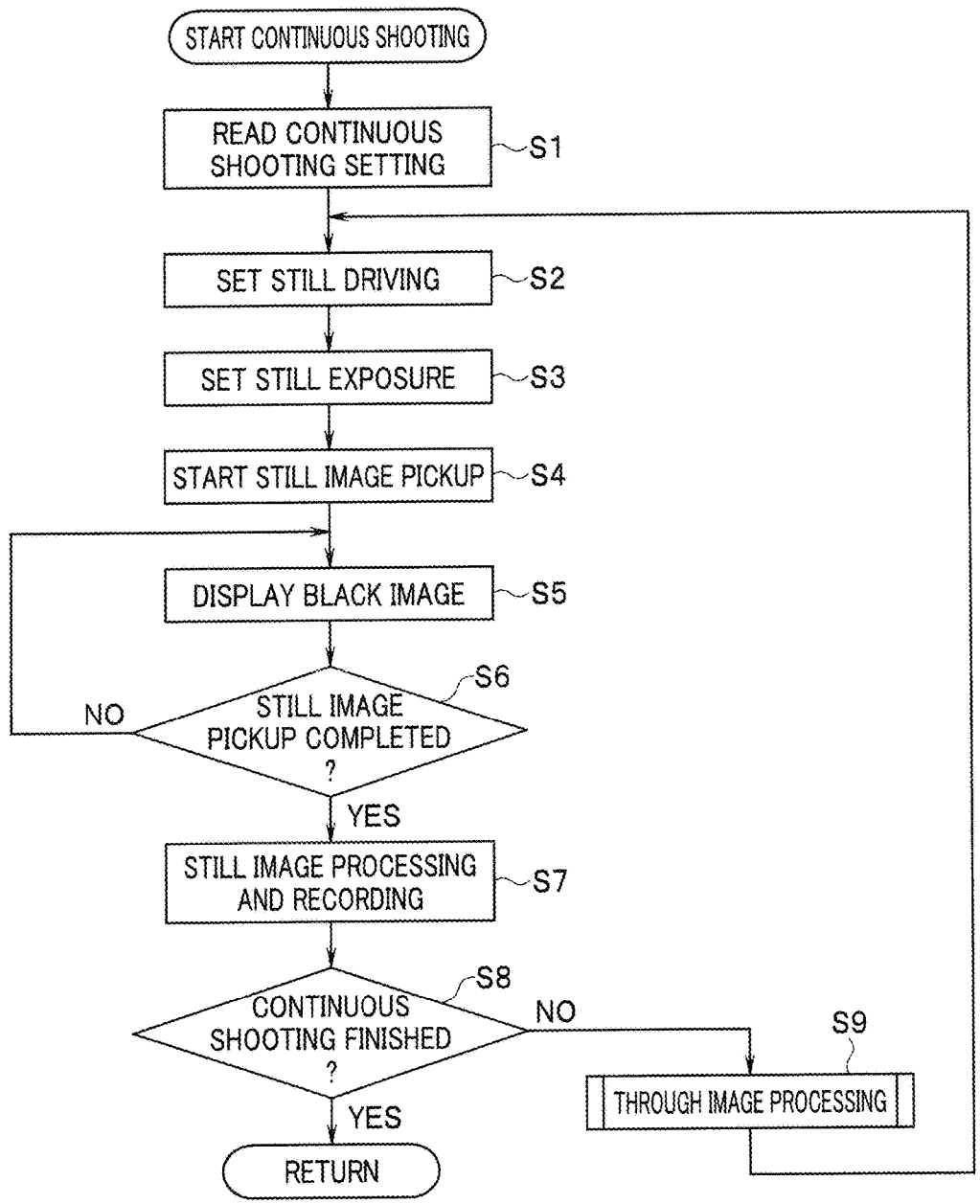
FIG. 3 is a flowchart illustrating processing at the time of continuous shooting in the image pickup apparatus according to the first embodiment.

Then, FIG. 3 is a flowchart illustrating processing at the time of continuous shooting in the image pickup apparatus 1. This processing (and processing illustrated in each of flowcharts, described below) is performed based on control by the microcomputer 51 serving as the control section.

When the power to the image pickup apparatus 1 is turned on by the power button to perform processing in a main routine (not illustrated), the image pickup apparatus 1 is set to a continuous shooting mode by an operation of the operation section 49. When the release button is half-pressed (the 1st release switch is turned on) so that AE processing and AF processing are performed, and the release button is further full-pressed so that the 2nd release switch is maintained in an on state, this processing is performed.

First, continuous shooting settings such as a continuous shooting mode and the number of continuous shooting frames are read (step S1). While examples of a system, which can be loaded into the image pickup apparatus 1, as a continuous shooting mode system include a REC VIEW system (REC VIEW continuous shooting) and a live view system (live view continuous shooting), the following description assumes that only the live view continuous shooting is loaded into the image pickup apparatus 1 or both the REC VIEW continuous shooting and the live view continuous shooting are loaded into the image pickup apparatus 1 but the live view continuous shooting is selected.

Then, the image pickup device 32 is set to still driving (step S2), and a shooting condition/exposure condition for shooting a still image is calculated and set (step S3).

When preparation for shooting is completed, exposure by the image pickup device 32 is started (step S4).

Figure 7:
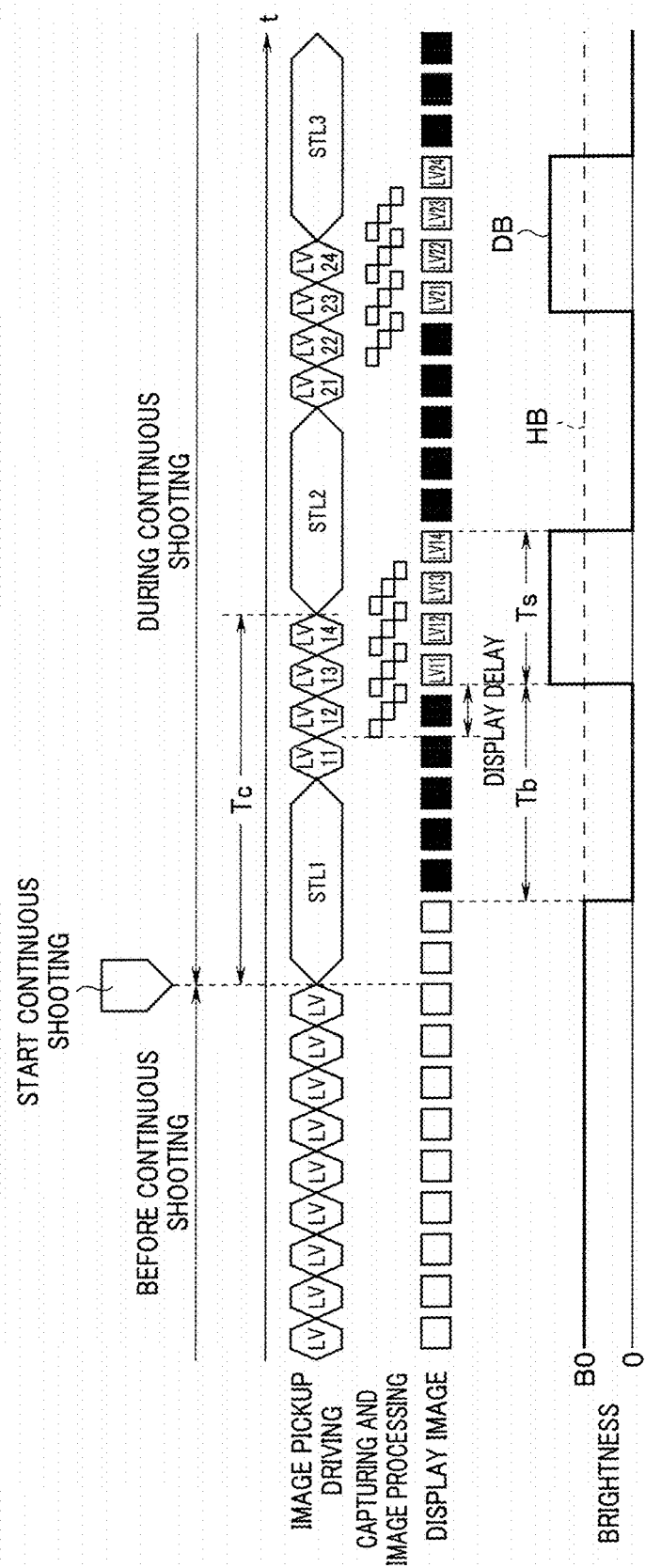
FIG. 7 is a timing chart illustrating the flow of processing of the image pickup apparatus before and after the start of continuous shooting in the first embodiment.

After the exposure is started, a live view image acquired before continuous shooting is started is also displayed for almost a display delay time period (a time period during which a delay has occurred before the image is displayed by being captured and processed) (see FIG. 7). However, if the display of the live view image for almost the display delay time period is finished, a black image is then displayed on the LCD 45 or the EVF 47 based on the control by the microcomputer 51 (step S5).

It is determined whether an exposure time period, which has been set in step S3, has elapsed (step S6). If it is determined that the exposure time period has not elapsed, the display of the black image in step S5 is continued.

If it is determined that the exposure time period has elapsed in step S6, processing for reading out the generated image from the image pickup device 32, processing the read image by the analog processing section 33 and the A/D conversion section 34, storing the processed image in the SDRAM 36, then processing the stored image by the image processing section 37, and recording the processed image on the recording medium 43 via the memory I/F 42 is performed (step S7). However, a time period is required to read out and process the still image. Therefore, the processing in step S7 is performed in parallel with processing in step S9, described below, as long as the continuous shooting is not finished.

Then, it is determined whether the on state of the 2nd release switch is released, and a photographer has issued an instruction to finish the continuous shooting (step S8).

Figure 4:
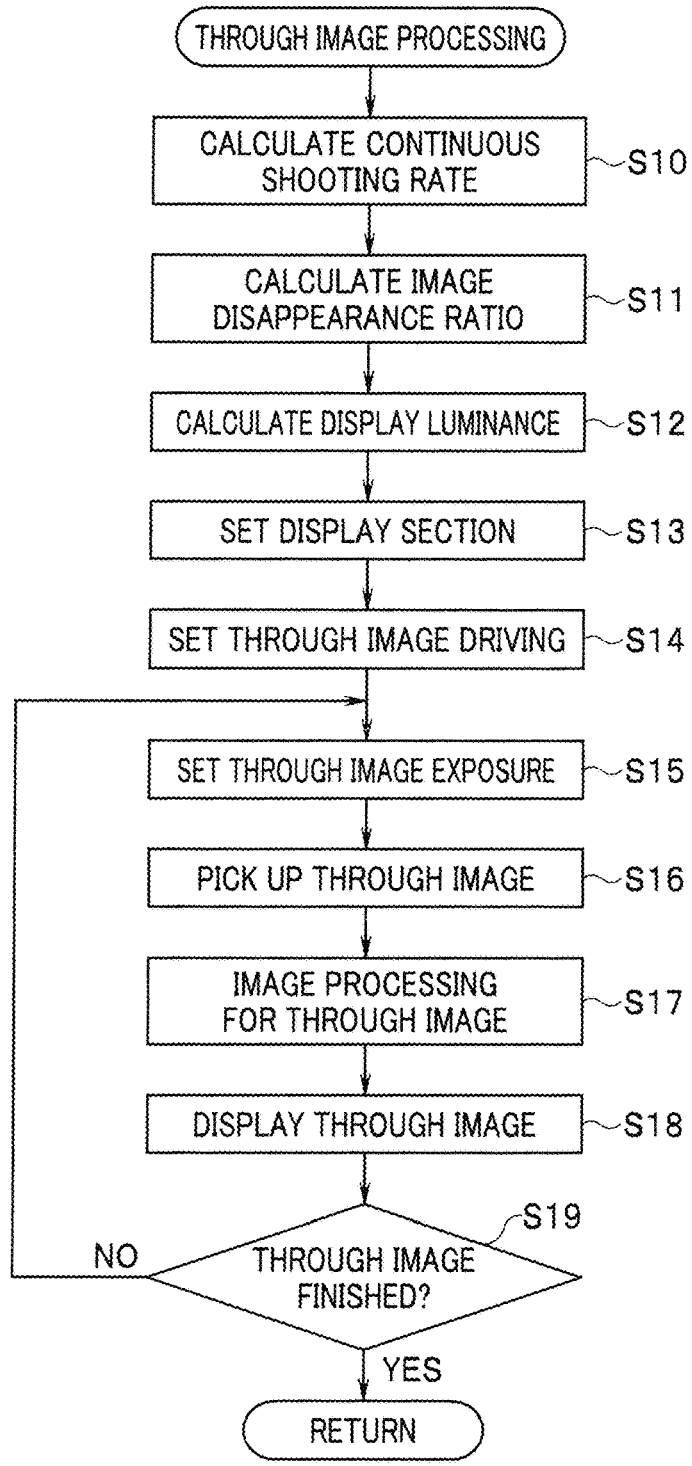
FIG. 4 is a flowchart illustrating details of through image processing in step S9 illustrated in FIG. 3 in the first embodiment.

If it is determined that the 2nd release switch is maintained in the on state, through image processing described below with reference to FIG. 4, is performed (step S9). That is, while the black image is displayed until still image pickup is completed after being started, excluding display delay, the still image pickup shifts to through image display after being completed as long as the continuous shooting is not finished.

If the through image processing in step S9 is performed for a predetermined time period, the processing returns to step S2 to perform the aforementioned processing, to shoot a subsequent still image.

On the other hand, if it is determined that the on state of the 2nd release switch has been released in step S8, the continuous shooting is finished. The processing returns to the main processing (not illustrated).

FIG. 4 is a flowchart illustrating details of the through image processing in step S9 illustrated in FIG. 3.

When the processing is started, the display luminance change section 3 calculates a continuous shooting rate N (step S10).

A "continuous shooting rate" indicates how many frames in a still image are shot per second, and is represented using the number of frames (fps) per second as a unit. Continuous shooting is generally performed at a previously set continuous shooting rate.

However, if an exposure time period set based on exposure control is longer than an exposure time period per frame calculated from a previously set continuous shooting rate, continuous shooting cannot be performed at a previously set continuous shooting rate.

When the recording medium 43 is a memory card, for example, products of the recording medium 43 have various media recording speeds. Therefore, a plurality of still images obtained by continuous shooting may be unable to be written into the recording medium 43 immediately after being shot. In such a case, continuous shooting is continued using a built-in memory such as the SDRAM 36 in the camera body 30 or the flash memory 50 as a buffer. However, when the built-in memory becomes "buffer full" in a relationship between the capacity of the built-in memory and the media recording speed, continuous shooting cannot be performed at a previously set continuous shooting rate.

Therefore, the continuous shooting rate N herein calculated is a continuous shooting rate reflecting such an actual shooting status.

FIG. 7 is a timing chart illustrating the flow of processing of the image pickup apparatus 1 before and after the start of continuous shooting.

As illustrated in FIG. 7, a live view image LV is continuously picked up and displayed before the continuous shooting is started. Brightness of a display image immediately before the start of the continuous shooting (a display luminance value before the continuous shooting) is used as a reference display luminance value B0, described below, for example. Even if the continuous shooting is started, the live view image LV shot before the continuous shooting is displayed only for a display delay time period (a time period corresponding to two frames in the live view image LV in an example illustrated in FIG. 7), as described above. However, a black image is then displayed to correspond to pickup of a still image.

In the example illustrated in FIG. 7, Tc is a time period from the time point where one still image starts to be shot to the time point where a subsequent one still image starts to be shot. Therefore, a continuous shooting rate N is calculated from N=1/Tc. During the continuous shooting, a period during which a still image (e.g., STL1) is shot is a still image shooting period, and a period between periods during which two continuous still images (e.g., STL1 and STL2) are respectively shot is a live view shooting period (a period during which through images LV11 to LV14 corresponding to four frames are shot in the example illustrated in FIG. 7). Note that the live view shooting period and a live view display period shift by only the display delay time period.

Similarly, the still image shooting period and a black image display period (a period other than the live view display period) also shift by only the display delay time period.

Then, the display luminance change section 3 calculates an image disappearance ratio R (step S11).

An "image disappearance ratio" is a ratio of a time period during which a through image is not displayed to a time period (Tc in the example illustrated in FIG. 7) from the time point where one still image starts to be shot to the time point where a subsequent still image starts to be shot. In the example illustrated in FIG. 7, a time period during which a through image is displayed (a live view display period) is Ts, a time period during which a through image is not displayed (a period other than the live view display period) is Tb= (Tc−Ts). Therefore, the image disappearance ratio R is calculated from R=Tb/Tc.

While the image disappearance ratio generally tends to increase when the number of continuous shooting frames increases, the number of continuous shooting frames changes according to various types of conditions, as described above. Further, the length of a time period during which a through image can be shot differs, and thus the image disappearance ratio R differs even if the number of continuous shooting frames is the same between a case where an exposure time period is long and a case where an exposure time period is short. Similarly, the image disappearance ratio also differs between a case where the buffer has enough space and a case where the buffer is full.

Therefore, the image disappearance ratio R herein calculated is an image disappearance ratio reflecting such an actual shooting status.

Then, the display luminance change section 3 calculates a during-continuous-shooting display luminance value B based on the continuous shooting rate N which has been calculated in step S10, and the image disappearance ratio R which has been calculated in step S11 (step S12).

The during-continuous-shooting display luminance value B is calculated by calculating a weight W corresponding to a reference display luminance value B0 and multiplying the reference display luminance value B0 by the calculated weight W, for example. The reference display luminance value B0 is a normal display luminance value calculated based on a normal setting condition. An example of the reference display luminance value B0 can include a display luminance value before continuous shooting (see an example in which the display luminance value before continuous shooting is used as the reference display luminance value B0 in FIG. 7).

The weight W is calculated by multiplying a basic weight Wr based on the image disappearance ratio R by a correction coefficient K based on the continuous shooting rate N.

As described above, a person senses brightness of an image by an integral value. Therefore, the person feels as if the brightness of the image were reduced by almost half when the image disappearance ratio R is one half (i.e., when a display time period of a black image and a display time period of a live view image are the same), or feels as if the brightness of the image were reduced to almost one third when the image disappearance ratio R is two third (i.e., when the display time period of the black image is two times the display time period of the live view image).

Thus, the basic weight Wr is set to gradually increase as the image disappearance ratio R increases in a range of a value equal to or more than 1 in principle to inhibit a luminance sensed by the person (visual luminance) from decreasing as the image disappearance ratio R increases.

A simplest method for setting the basic weight Wr is a method for setting the basic weight Wr so that a luminance value obtained by time-averaging the during-continuous-shooting display luminance value B of the live view image and a display luminance value of the black image during the continuous shooting matches the reference display luminance value B0, letting B=B0×Wr. If an ideal case where the display luminance value of the black image is zero (however, it is difficult to completely block luminance of a back light or the like by the black image, and thus the display luminance value of the black image actually has some values) is taken as an example, the basic weight Wr is set as Wr=1/(1−R) (i.e., B=B0/(1−R)).

Figure 5:
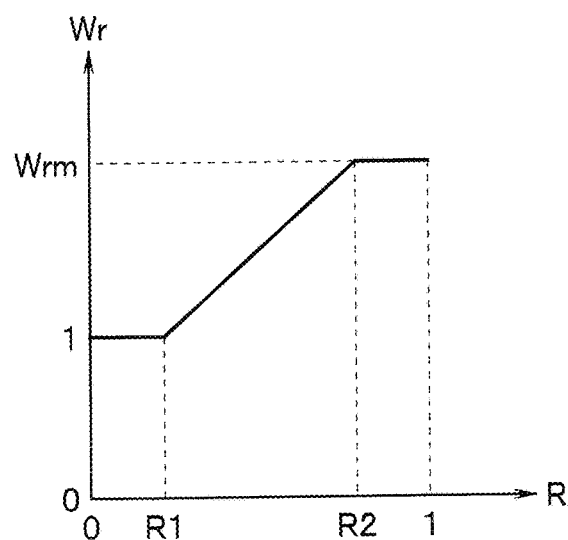
FIG. 5 is a diagram illustrating an example in which a basic weight corresponding to a reference display luminance value is determined according to an image disappearance ratio in the first embodiment.

On the other hand, a setting example of the basic weight Wr more matching an actual product is illustrated in FIG. 5. FIG. 5 is a diagram illustrating an example in which a basic weight Wr corresponding to a reference display luminance value B0 is determined according to an image disappearance ratio R. Note that, if live view continuous shooting for acquiring a through image during continuous shooting is set, and a still image composed of one or more frames has been shot during continuous shooting, and a through image composed of one or more frames is shot, a range of a value which can be taken by the image disappearance ratio R is 0<R<1.

In an example illustrated in FIG. 5, the basic weight Wr is 1 when 0<R≤R1, monotonously increases when R1<R<R2, and takes a maximum value Wrm when R2≤R<1.

First, when the image disappearance ratio R is low (0<R≤R1), a decrease in display luminance value is relatively small. Thus, there is no or hardly any unnatural feeling due to the decrease in luminance. Therefore, the display luminance value is not changed at this time. On the other hand, if the display luminance value is increased, there is an upper limit to the display luminance value according to a configuration of the display section 4. As a specific example, there are respectively upper limits to a back light luminance value and a front light luminance value of each of the LCD 45 and the EVF 47. Therefore, when R2≤R<1, the basic weight Wr cannot be increased to not less than a maximum value Wrm (is clipped to an upper limit value) because the display luminance value has reached such an upper limit. R1<R<R2 is a zone where the basic weight Wr increases as the image disappearance ratio R increases.

Figure 6:
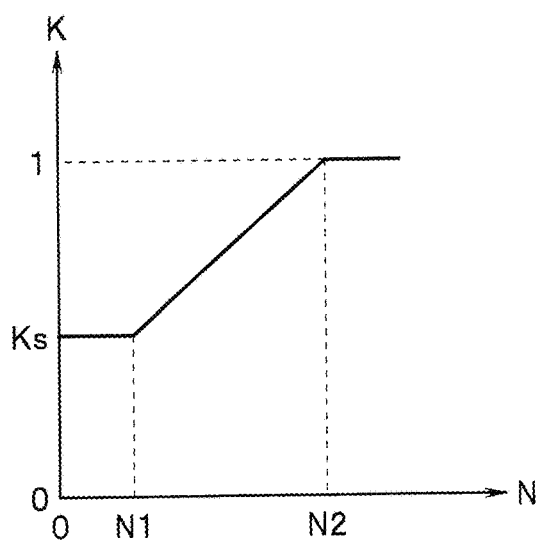
FIG. 6 is a diagram illustrating an example in which a correction coefficient for further controlling a luminance increase amount corresponding to a reference display luminance value is determined according to a continuous shooting rate in the first embodiment.

Then, FIG. 6 is a diagram illustrating an example in which a correction coefficient K for further controlling a luminance increase amount corresponding to a reference display luminance value B0 is determined according to a continuous shooting rate N. Note that a range of a value, which can be taken by the continuous shooting rate N, is 0<N.

In an example illustrated in FIG. 6, while the correction coefficient K takes a minimum value Ks (Ks<1) when 0<N≤N1, the correction coefficient K monotonously increases when N1<N<N2, and takes a maximum value of 1 when N2≤N. Therefore, the correction coefficient K is a coefficient taking a range of Ks≤K≤1, i.e., suppressing an increase in display luminance value.

Furthermore, the display luminance change section 3 calculates a weight W, as described below, using the basic weight Wr and the correction coefficient K found in the aforementioned manner:

$$W = 1 + K \times (Wr - 1)$$

That is, the weight W is obtained by suppressing a portion where a value in the basic weight Wr is larger than 1 using the correction coefficient K. Since (Wr−1)≥0 and K>0, W≥1.

Particularly, W>1 except when an image disappearance ratio R is small (0<R≤R1) (i.e., except when a luminance need not be increased in practice).

The display luminance change section 3 calculates a during-continuous-shooting display luminance value B using the calculated weight W by the following equation:

$$B = W \times B0$$

Therefore, the weight W is a weight for increasing a reference display luminance value B0 under a predetermined condition (R1<R). The display luminance change section 3 calculates the during-continuous-shooting display luminance value B larger than the reference display luminance value B0 serving as a normal display luminance value calculated based on a normal setting condition.

A setting of a display luminance value of the display section 4 is changed, for example, based on the during-continuous-shooting display luminance value B calculated by the display luminance change section 3 (step S13).

While luminance of a live view image is changed by changing an illumination luminance value (e.g., a back light luminance value or a front light luminance value) of a display setting value (the display section 4 (e.g., the LCD 45 or the EVF 47) based on the during-continuous-shooting display luminance value B, for example, the present invention is not limited to this.

For example, the luminance of the live view image may be changed by changing a display gradation characteristic value (e.g., a display gamma characteristic value) of the display section 4 serving as a display setting value based on the during-continuous-shooting display luminance value B, and the change in the illumination luminance value and the change in the display gradation characteristic value may be combined with each other.

In these cases, the microcomputer 51, the LCD driver 44, and the EVF driver 46, for example, correspond to the display luminance change section 3.

The luminance of the live view image can also be changed by changing image data of the live view image based on the during-continuous-shooting display luminance value B.

For example, the image data may be changed by changing a target exposure value (target AE value) in acquiring the image data or changing an exposure correction amount in acquiring the image data. In this case, the microcomputer 51 or further the AE processing section 38, for example, correspond to the display luminance change section 3.

Furthermore, the image data may be changed by changing a gradation conversion characteristic for the image data. In this case, the microcomputer 51 and the gradation processing section 63 in the image processing section 37, for example, correspond to the display luminance change section 3.

In addition, the image data may be changed by changing a gain value for the image data. In this case, the microcomputer 51, and the analog processing section 33 (when the gain is an analog gain) or the image processing section 37 (when the gain is a digital gain), for example, correspond to the display luminance change section 3.

Various types of methods for changing the luminance of the live view image herein described may be combined with one another, as needed. Note that, while some of the methods herein described may lose some of gradation reproducibility of a highlight portion, an object to reduce a change in brightness of a through image during continuous shooting can be achieved.

FIG. 7 indicates that a display luminance value DB of a through image during continuous shooting is higher than a display luminance value before continuous shooting (e.g., a reference display luminance value B0) by such a setting change. In an example illustrated in FIG. 7, the display luminance value DB is set so that a display luminance value HB sensed by a person matches the reference display luminance value B0.

Note that each of respective relationships as illustrated in FIGS. 5 and 6 is previously stored as table data, for example, in the flash memory 50. However, the relationship may be not only stored as the table data but also stored as a function, for example.

Then, the image pickup device 32 is set to through image driving (step S14), and a shooting condition/exposure condition for shooting the through image is calculated and set (step S15).

A through image corresponding to one frame is picked up under the set shooting condition (step S16), and image data for display is generated by performing image processing for acquired image data (step S17).

The image data corresponding to one frame thus generated is displayed on the display section 4 (step S18).

Then, it is determined whether a through image shooting period between two continuous still image shooting periods has been finished (step S19).

If it is determined that the through image shooting period has not been finished, the processing returns to step S15 to perform the aforementioned processing, to pick up a through image corresponding to a subsequent frame.

On the other hand, if it is determined that the through image shooting period has been finished in step S19, the processing returns to the processing illustrated in FIG. 3.

According to the first embodiment, the decrease in the visual luminance caused by the display during the live view display period and the display during the period other than the live view display period being alternately performed can be suppressed at the time of the continuous shooting to calculate the during-continuous-shooting display luminance value B larger than the reference display luminance value B0 serving as a normal display luminance value calculated based on the normal setting condition and change the luminance of the live view image displayed on the display section 4 based on the during-continuous-shooting display luminance value B.

Furthermore, the during-continuous-shooting display luminance value is calculated to increase as the image disappearance ratio R representing a ratio of a period during which a black image is displayed to a continuous shooting period increases. Therefore, the visual luminance can be appropriately inhibited from more decreasing as the image disappearance ratio R increases so that an image having brightness not according to the image disappearance ratio R can be observed.

The during-continuous-shooting display luminance value B is calculated to approach the reference display luminance value B0 serving as a normal display luminance value as the continuous shooting rate N decreases. Therefore, appropriate control of the visual luminance according to a ratio of respective display time periods of the live view image and the black image can be performed. When the during-continuous-shooting display luminance value B is controlled based on only the image disappearance ratio R, for example, if an exposure time period of a still image during continuous shooting is long, the bright live view image is displayed for only a very short time period after the black image is displayed for a long time period. However, in this case, glare like flash firing is felt in this case. On the other hand, comfortable display during continuous shooting can be implemented by performing control based on the continuous shooting rate N to reduce such glare.

When the luminance of the live view image displayed on the display section 4 is changed by setting the display setting value based on the during-continuous-shooting display luminance value B, the image data of the live view image need not be changed, and a load for image processing can be reduced.

When the display setting value includes at least one of the illumination luminance value of the display section 4 and the display gradation characteristic value of the display section 4, at least one of an absolute change in brightness of an image by a change in illumination luminance and an adjustment of brightness by a change in gradation within a dynamic range of the image can be performed. If the change in the illumination luminance and the change in the display gradation characteristic are combined with each other, a wider brightness range can be coped with.

On the other hand, when the luminance of the live view image displayed on the display section 4 is changed by changing the image data based on the during-continuous-shooting display luminance value B, even if the luminance of the live view image has reached a limit of a range which can be changed by adjusting the display setting value of the display section 4, the adjustment can be further performed. Even if the live view image is displayed on the display section 4 the display setting value of which cannot be adjusted, the brightness of the image can be adjusted.

When image data is changed by a change in a target exposure value in acquiring the image data or a change in an exposure correction amount in acquiring the image data, occurrence of overexposure in a dark portion and underexposure in a bright portion, like when the image data is changed by a change in a gradation conversion characteristic, can be suppressed.

If image data is changed by a change in a gradation conversion characteristic for the image data, a shooting condition corresponding to a live view image need not be changed. Even when the limit of the range of the live view image is reached, the limit being able to be reached by a change of exposure from the limit, etc. by the frame rate, it is possible to further adjust the luminance of the live view mage.

In addition, even if image data is changed by changing a gain value for the image data, a shooting condition such as an exposure time period or an aperture value for a live view image need not be changed.

Second Embodiment

Figure 8:
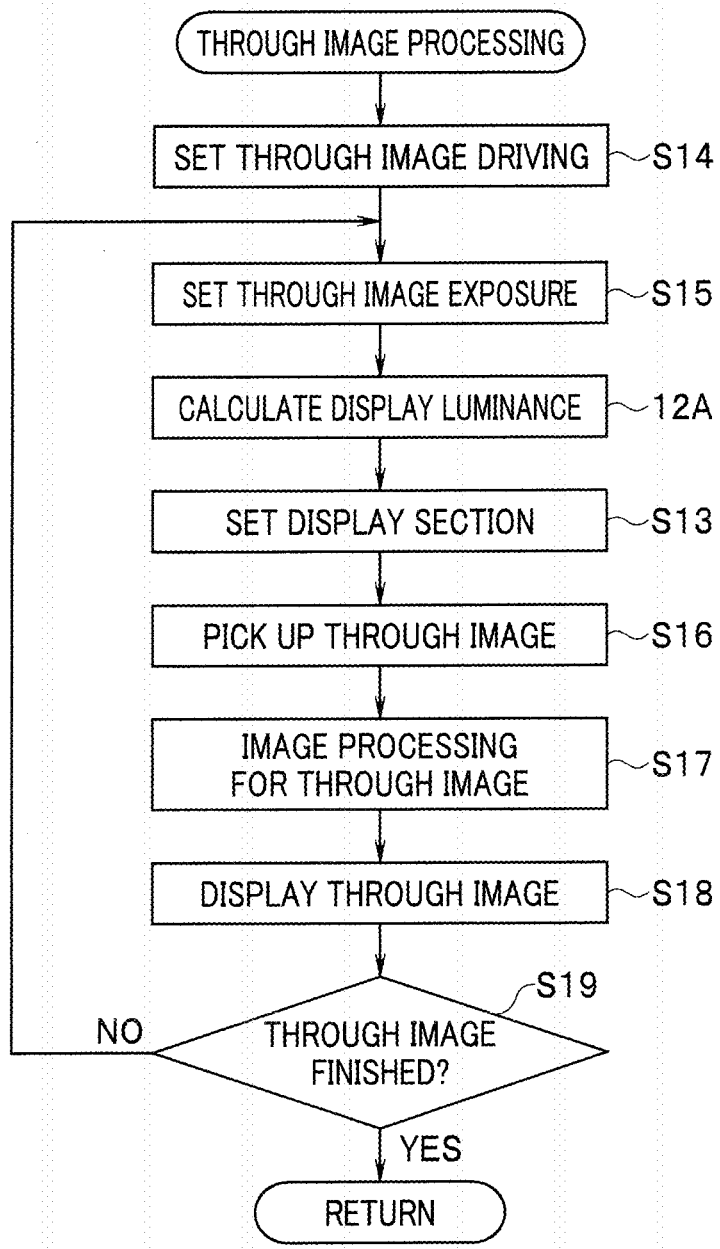
FIG. 8 is a flowchart illustrating details of through image processing in a second embodiment of the present invention.
Figure 9:
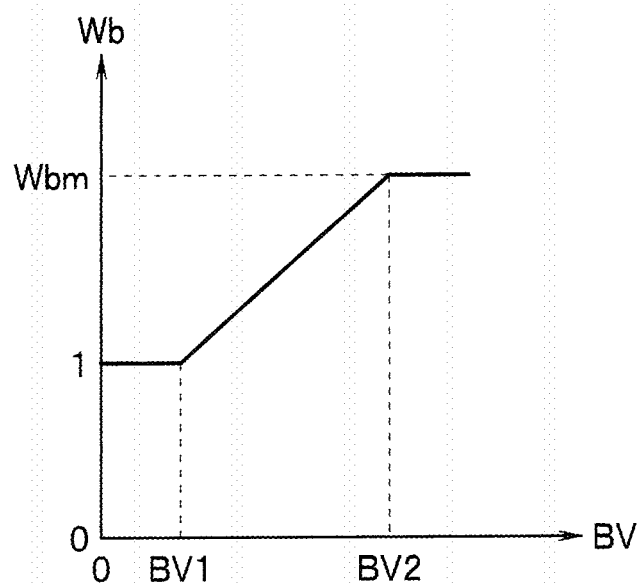
FIG. 9 is a diagram illustrating an example in which a weight corresponding to a reference display luminance value is determined according to an object luminance value in the second embodiment.
Figure 10:
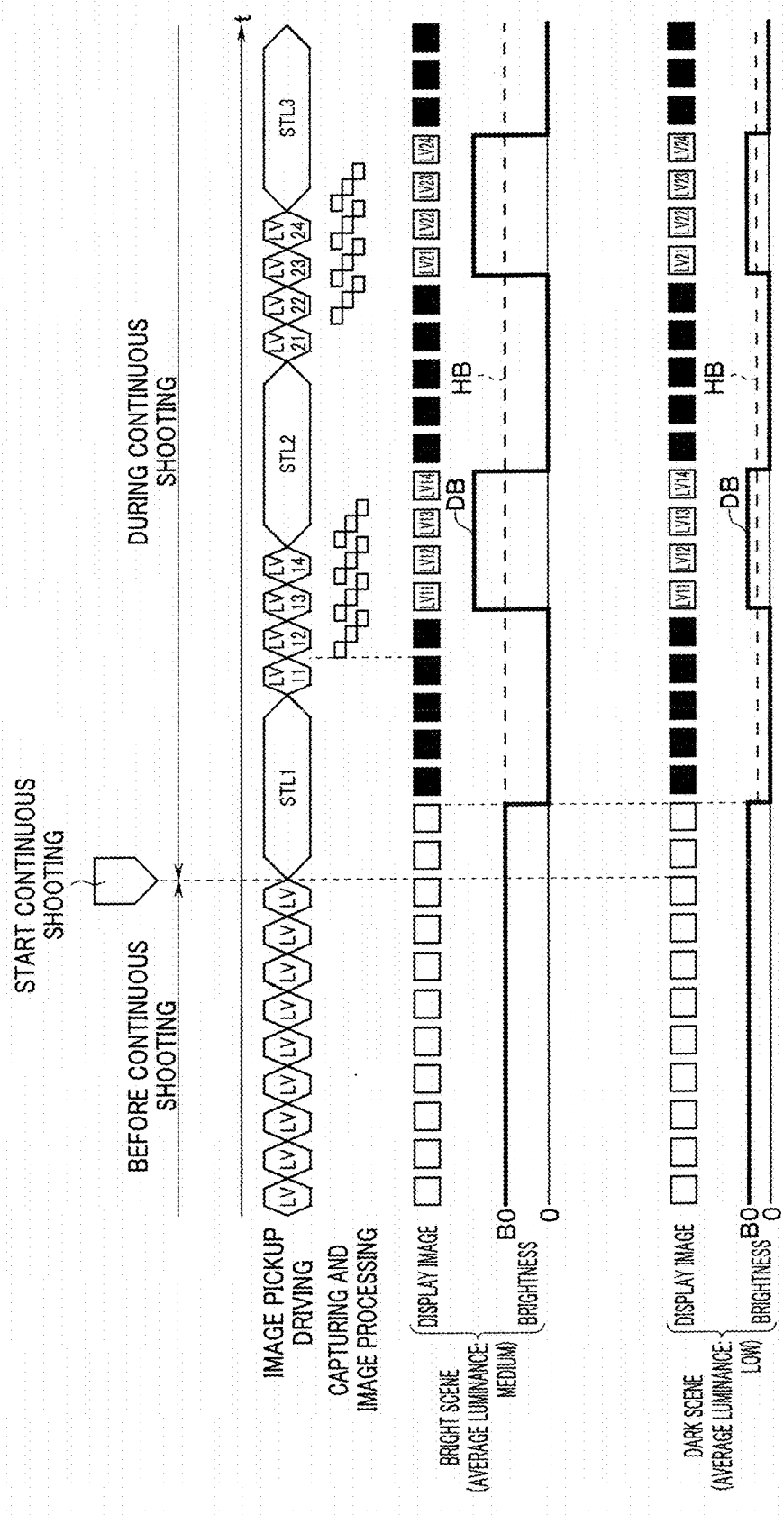
FIG. 10 is a timing chart illustrating the flow of processing of an image pickup apparatus before and after the start of continuous shooting in the second embodiment.

FIGS. 8 to 10 illustrate a second embodiment of the present invention, where FIG. 8 is a flowchart illustrating details of through image processing.

In the second embodiment, similar sections to the sections in the aforementioned first embodiment are assigned the same reference numerals, to omit description, as needed, and to mainly describe different points.

While the during-continuous-shooting display luminance value B is controlled according to the image disappearance ratio R and the continuous shooting rate N in the aforementioned first embodiment, a during-continuous-shooting display luminance value B is controlled according to an object luminance value BV in the present embodiment.

First, a configuration of an image pickup apparatus 1 according to the present embodiment is similar to the configuration illustrated in FIGS. 1 and 2 in the first embodiment, and processing during continuous shooting in the image pickup apparatus 1 according to the present embodiment is similar to the processing illustrated in FIG. 3 in the first embodiment.

On the other hand, a content of through image processing in step S9 illustrated in FIG. 3 is illustrated in FIG. 8 in the present embodiment.

That is, when processing illustrated in FIG. 8 is started, a process in step S14, described above, is first performed, to set an image pickup device 32 to through image driving.

Then, a process in step S15, described above, is performed, to calculate and set a shooting condition/exposure condition for shooting a through image.

Then, a display luminance change section 3 calculates the during-continuous-shooting display luminance value B based on the object luminance value BV calculated by an AE processing section 38 (step S12A).

FIG. 9 is a diagram illustrating an example in which a weight Wb corresponding to a reference display luminance value B0 is determined according to an object luminance value By.

First, the object luminance value BV is calculated as an average object luminance value or a weighted average luminance value, for example. In the example illustrated in FIG. 9, the weight Wb is 1 when $0<BV \leq BV1$, but monotonously increases when $BV1<BV<BV2$, and takes a maximum value Wbm when $BV2 \leq BV$.

First, when the object luminance value BV is small ($0<BV \leq BV1$), a variation between scotopic vision and photopic vision is small, and a contrast between a black image and a through image is relatively small. Even if a black image corresponding to one or more frames and a through image corresponding to one or more frames are alternatively displayed, an unnatural feeling for a brightness change is small. Therefore, a during-continuous-shooting display luminance value B is not changed at this time.

On the other hand, as the object luminance value BV increases, the variation between the scotopic vision and the photopic vision increases, and the contrast between the black image and the through image increases. In this case, darkness of the black image is easily felt, and the unnatural feeling for the brightness change also gradually increases. When $BV1<BV<BV2$, the during-continuous-shooting display luminance value B is gradually increased (i.e., the weight Wb is increased) as the object luminance value BV increases.

Furthermore, when $BV2 \leq BV$, the weight Wb has reached an upper limit for increasing the during-continuous-shooting display luminance value B, and thus is clipped to the maximum value Wbm.

Note that a relationship as illustrated in FIG. 9 is previously stored as table data or a function, for example, in a flash memory 50.

The display luminance change section 3 calculates the during-continuous-shooting display luminance value B using the calculated weight Wb by the following equation:

$$B = Wb \times B0$$

Thus, a process in step S13, described above, is performed, to change a setting of a display luminance value of the display section 4, for example, based on the during-continuous-shooting display luminance value B calculated by the display luminance change section 3.

FIG. 10 is a timing chart illustrating the flow of processing of the image pickup apparatus 1 before and after the start of continuous shooting. In FIG. 10, a setting example of a display luminance for a bright scene where the object luminance value BV is medium and a setting example of a display luminance for a dark scene where the object luminance value BV is small are written together.

As seen from FIG. 10 with reference to FIG. 9, the display luminance value DB is equal to the reference display luminance value B0 in a dark scene (0<BV≤BV1), and is larger than the reference display luminance value B0 in a bright scene (BV1<BV).

Then, processes in steps S16 to S19 similar to the processes in steps in the aforementioned first embodiment are performed. If it is determined that a through image shooting period has not been finished in step S19, the processing returns to step S15. If it is determined that the through image shooting period has been finished, the processing returns to the processing illustrated in FIG. 3.

According to the second embodiment, even if the during-continuous-shooting display luminance value B is calculated so that a ratio (the weight Wb) of the during-continuous-shooting display luminance value B to the reference display luminance value B0 serving as a normal display luminance value increases as the object luminance value BV increases, a decrease in visual luminance caused by display during a live view display period and display during a period other than the live view display period being alternately performed at the time of continuous shooting can be suppressed, almost like in the aforementioned first embodiment.

Furthermore, the degree to which the image is felt dark by a black image being sandwiched between through images changes according to a contrast between the black image and the through images. Even if a black image is sandwiched between through images such as a starry sky and a night view, for example, the image is not easily felt to become dark. On the other hand, when a black image is sandwiched between through images such as a scene in the hot sun, the image is easily definitely felt to become dark. On the other hand, in the configuration according to the present embodiment, the image can be effectively inhibited from being felt to become dark.

Third Embodiment

Figure 11:
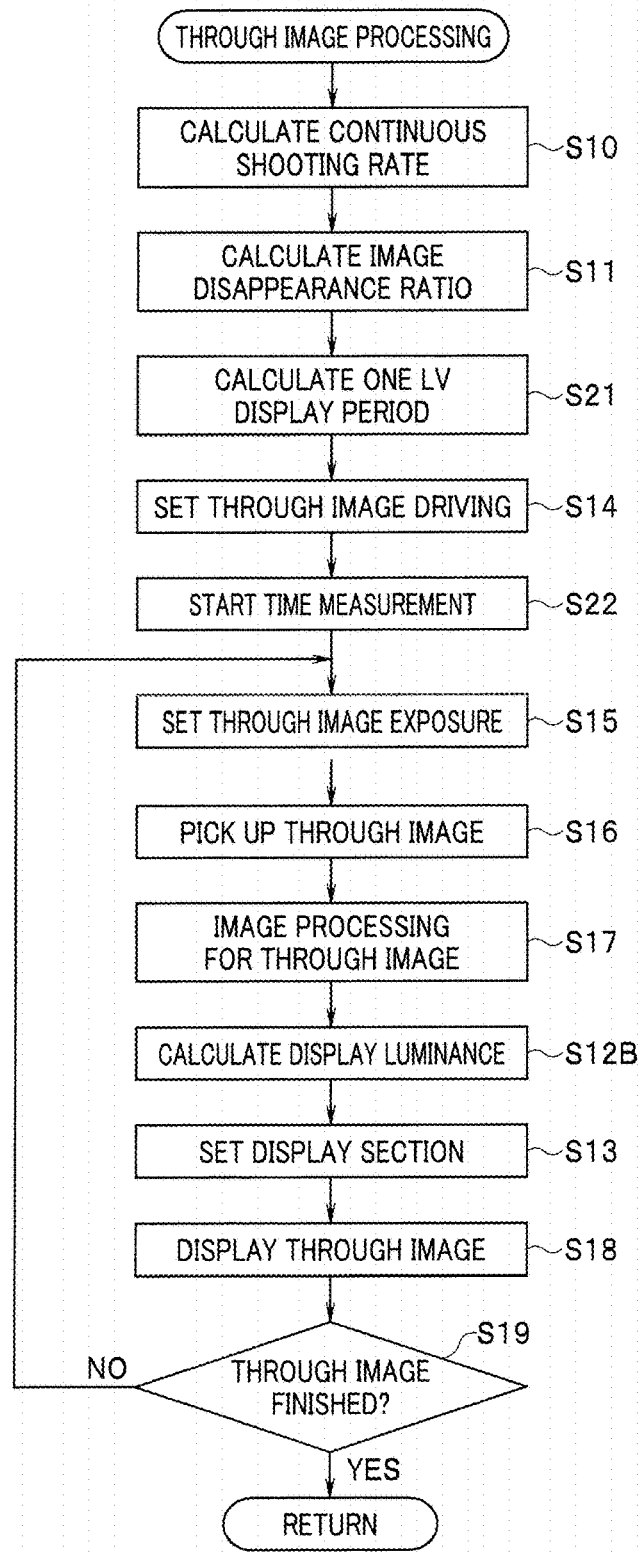
FIG. 11 is a flowchart illustrating details of through image processing in a third embodiment of the present invention.
Figure 12:
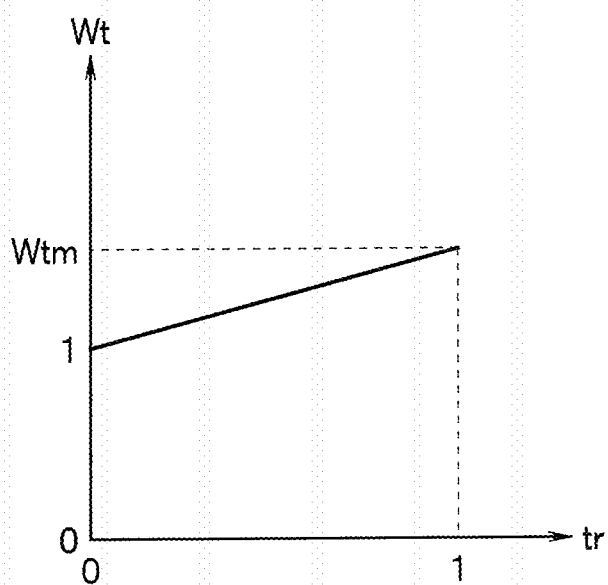
FIG. 12 is a diagram illustrating an example in which a weight corresponding to a reference display luminance value is changed according to a display time ratio in the third embodiment.
Figure 13:
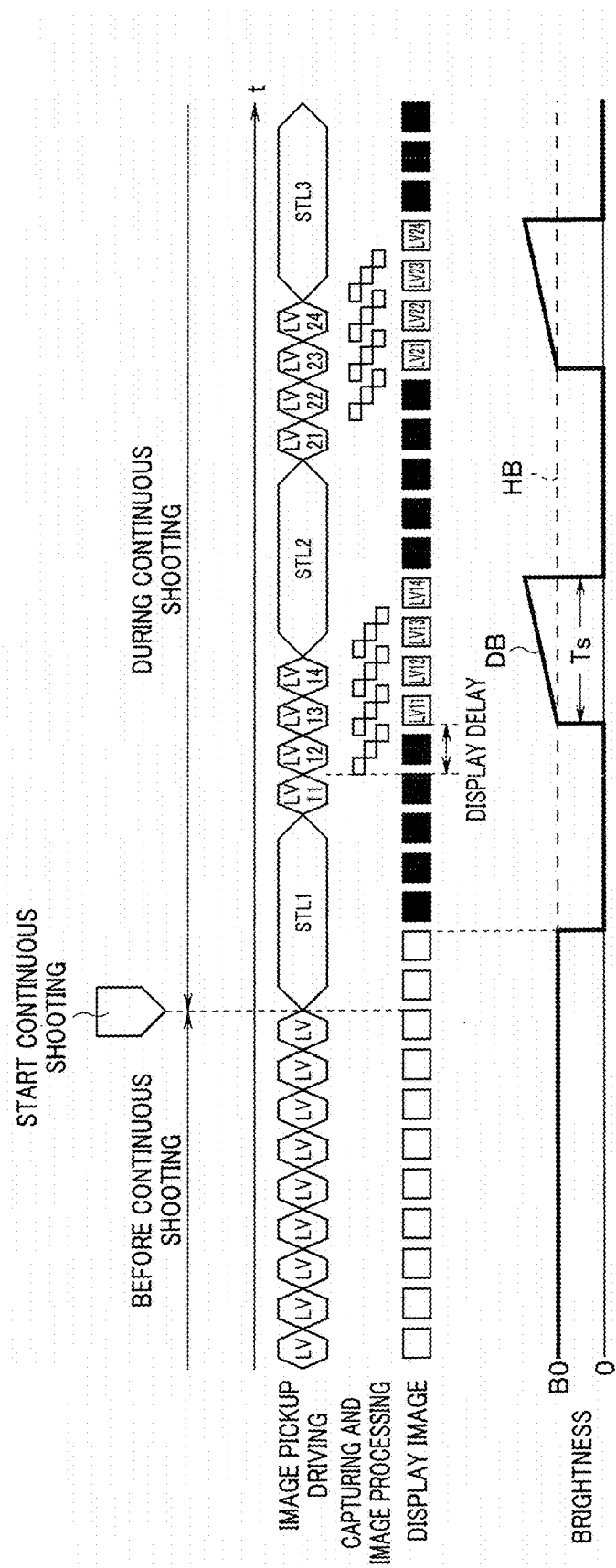
FIG. 13 is a timing chart illustrating the flow of processing of an image pickup apparatus before and after the start of continuous shooting in the third embodiment.

FIGS. 11 to 13 illustrates a third embodiment of the present invention, where FIG. 11 is a flowchart illustrating details of through image processing.

In the third embodiment, similar sections to the sections in the aforementioned first and second embodiments are assigned the same reference numerals, to omit description, as needed, and to mainly describe different points.

While the during-continuous-shooting display luminance value B of the through image in the one live view display period is constant in the aforementioned first embodiment, a during-continuous-shooting display luminance value B of a through image in one live view display period is gradually changed according to a lapse of a time period.

Also in the present embodiment, a configuration of an image pickup apparatus 1 is similar to the configuration illustrated in FIGS. 1 and 2, and processing during continuous shooting is similar to the processing illustrated in FIG. 3.

On the other hand, a content of through image processing in step S9 illustrated in FIG. 3 is illustrated in FIG. 11 in the present embodiment.

That is, when processing illustrated in FIG. 11 is started, a process in step S10, described above, is first performed to calculate a continuous shooting rate N, and a process in step S11, described above, is performed to calculate an image disappearance ratio R.

Then, a display luminance change section 3 calculates one live view (LV) display period Ts (see FIG. 13) based on the continuous shooting rate N and the image disappearance ratio R, for example, as given by the following equation (step S21):

$$Ts=(1-R)/N$$

Then, a process in step S14, described above, is performed, to set an image pickup device 32 to through image driving.

Furthermore, a live view display elapsed time period t serving as a time period elapsed since one live view display period Ts was started is reset, and the live view display elapsed time period t then starts to be measured (step S22).

Then, processes in steps S15 to S17, described above, are performed, to generate image data to be displayed as a through image.

The during-continuous-shooting display luminance value B of the through image is calculated based on the live view display elapsed time period t which has started to be measured in step S22 (step S12B).

That is, the display luminance change section 3 calculates a display time ratio tr by tr=(t/Ts), and further calculates a weight Wt according to the display time ratio tr.

FIG. 12 is a diagram illustrating an example in which the weight Wt corresponding to a reference display luminance value B0 is changed according to the display time ratio tr.

As illustrated in FIG. 12, the weight Wt monotonically increases from 1 to a maximum value Wtm as the display time ratio tr increases from 0 to 1.

While the maximum value Wtm may be made to match the weight W={1+K×(Wr−1)} in the aforementioned first embodiment, a time integral value of a display luminance value DB in one live view display period Ts may be set to a value matching the time integral value of the display luminance value DB in the one live view display period Ts in the first embodiment. For example, when the weight Wt illustrated in FIG. 12 is a primary function of the display time ratio tr, the maximum value Wtm is set, as given by the following equation:

$$Wtm=1+2\times(W-1)=1+2K\times(Wr-1)$$

Note that a relationship as illustrated in FIG. 12 is previously stored as table data or a function, for example, in a flash memory 50.

Furthermore, the display luminance change section 3 calculates the during-continuous-shooting display luminance value B using the calculated weight Wt by the following equation:

$$B=Wt\times B0$$

A process in step S13, described above, is performed, to change a setting of a display luminance value of a display section 4, for example, based on the during-continuous-shooting display luminance value B calculated by the display luminance change section 3, and a process in step S18, described above, is performed, to display image data corresponding to one frame on the display section 4.

FIG. 13 is a timing chart illustrating the flow of processing of the image pickup apparatus 1 before and after the start of continuous shooting.

As illustrated in FIG. 13, as the time elapses in the one live view display period Ts, the display luminance value DB increases.

Note that, while the display luminance value DB at the time point of the start of the live view display period Ts is made to match the reference display luminance value B0 in the example illustrated in FIGS. 12 and 13, the present invention is not limited to this because display is recognized to have become bright if a time average of the display luminance value DB in the one live view display period Ts becomes larger than the reference display luminance value B0.

Then, a process in step S19, described above, is performed. If it is determined that a through image shooting period has not been finished in step S19, the processing returns to step S15. If it is determined that the through image shooting period has been finished in step S19, the processing returns to the processing illustrated in FIG. 3.

According to the third embodiment, a substantially similar effect to that in the aforementioned first embodiment can be produced.

When a black image is switched to a live view image, the live view image may be felt glaring when luminance of the live view image is high. However, in the third embodiment, the during-continuous-shooting display luminance value B is calculated so that a ratio of the during-continuous-shooting display luminance value B to a reference display luminance value B0 serving as a normal display luminance value increases as the live view display elapsed time period t increases. Therefore, the display luminance value DB at the time point where one live view display period Ts has been started is suppressed so that such glare can be reduced.

Furthermore, according to the third embodiment, the display luminance value DB immediately before the end of the one live view display period Ts is high. Therefore, a contrast in switching from the live view image to the black image becomes high so that an interpolation effect of movement in the brain of a person can be more enhanced. Thus, movement of an object can be felt smoother.

Note that each of the aforementioned sections may be configured as a circuit. Any circuits may be mounted as a single circuit if they can perform the same function. Alternatively, any circuit may be mounted as a combination of a plurality of circuits. Further, any circuit is not limited to one configured as a dedicated circuit for performing an intended function but may be configured to perform the intended function by causing a general-purpose circuit to execute a processing program.

While the image pickup apparatus has been mainly described above, the present invention may be an image processing method for performing a similar action to that of the image pickup apparatus, a processing program (image pickup program) for causing a computer to perform similar processing to the processing performed by the image pickup apparatus, and a non-transitory computer readable recording medium storing the processing program, for example.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus capable of performing continuous shooting for continuously acquiring a plurality of still images, the image pickup apparatus comprising:
an image pickup circuit configured to shoot a live view image, which is read out in a shorter time period than each of the still images, in a live view shooting period between respective shooting periods of two continuous still images at the time of the continuous shooting;
a display configured to display the live view image acquired during the live view shooting period in a live view display period, and display a black image during a period other than the live view display period at the time of the continuous shooting; and
a display luminance change circuit configured to calculate a during-continuous-shooting display luminance value larger than a normal display luminance value calculated based on a normal setting condition and change luminance of the live view image displayed on the display based on the during-continuous-shooting display luminance value to suppress a decrease in visual luminance caused by the display during the live view display period and the display during the period other than the live view display period being alternately performed at the time of the continuous shooting, wherein
the display can change a display characteristic by changing a display setting value, and
the display luminance change circuit sets the display setting value based on the during-continuous-shooting display luminance value to change the luminance of the live view image displayed on the display.

2. The image pickup apparatus according to claim 1, wherein the display luminance change circuit calculates the during-continuous-shooting display luminance value so that the during-continuous-shooting display luminance value increases as an image disappearance ratio representing a ratio of the period during which the black image is displayed to a period of the continuous shooting increases.

3. The image pickup apparatus according to claim 2, wherein the display luminance change circuit calculates the during-continuous-shooting display luminance value so that the during-continuous-shooting display luminance value approaches the normal display luminance value as a continuous shooting rate representing the number of the still images acquired per unit time decreases.

4. The image pickup apparatus according to claim 1, wherein the display luminance change circuit calculates the during-continuous-shooting display luminance value so that a ratio of the during-continuous-shooting display luminance value to the normal display luminance value increases as an object luminance value increases.

5. The image pickup apparatus according to claim 1, wherein the display luminance change circuit calculates the during-continuous-shooting display luminance value so that a ratio of the during-continuous-shooting display luminance value to the normal display luminance value increases as a live view display elapsed time period serving as a time period elapsed after one of the live view display period is started increases.

6. The image pickup apparatus according to claim 1, wherein the display setting value includes at least one of an illumination luminance value of the display and a display gradation characteristic value of the display.

7. The image pickup apparatus according to claim 1, wherein the display luminance change circuit changes image data of the live view image outputted to the display based on the during-continuous-shooting display luminance value to change the luminance of the live view image displayed on the display.

8. The image pickup apparatus according to claim 7, wherein the image data is changed by at least one of a change in a target exposure value in acquiring the image data, a change in an exposure correction amount in acquiring the image data, a change in a gradation conversion characteristic for the image data, and a change in a gain value for the image data.

9. A non-transitory computer-readable medium storing a computer program, the computer program being an image pickup program for causing a computer in an image pickup apparatus to perform continuous shooting for continuously acquiring a plurality of still images, the image pickup program comprising:
- an image pickup step of shooting a live view image, which is read out in a shorter time period than each of the still images, in a live view shooting period between respective shooting periods of two continuous still images at the time of the continuous shooting;
- a display step of displaying the live view image acquired during the live view shooting period in a live view display period, and displaying a black image during a period other than the live view display period at the time of the continuous shooting; and
- a display luminance change step of calculating a during-continuous-shooting display luminance value larger than a normal display luminance value calculated based on a normal setting condition and changing luminance of the live view image displayed in the display step based on the during-continuous-shooting display luminance value to suppress a decrease in visual luminance caused by the display during the live view display period and the display during the period other than the live view display period being alternately performed at the time of the continuous shooting, wherein
the display step changes a display characteristic by changing a display setting value, and
the display luminance change step sets the display setting value based on the during-continuous-shooting display luminance value to change a display luminance of the live view image.

10. An image pickup method for performing continuous shooting for continuously acquiring a plurality of still images, the method comprising:
- an image pickup step of shooting a live view image, which is read out in a shorter time period than each of the still images, in a live view shooting period between respective shooting periods of two continuous still images at the time of the continuous shooting;
- a display step of displaying the live view image acquired during the live view shooting period in a live view display period, and displaying a black image during a period other than the live view display period at the time of the continuous shooting; and
- a display luminance change step of calculating a during-continuous-shooting display luminance value larger than a normal display luminance value calculated based on a normal setting condition and changing luminance of the live view image displayed in the display step based on the during-continuous-shooting display luminance value to suppress a decrease in visual luminance caused by the display during the live view display period and the display during the period other than the live view display period being alternately performed at the time of the continuous shooting, wherein
the display step changes a display characteristic by changing a display setting value, and
the display luminance change step sets the display setting value based on the during-continuous-shooting display luminance value to change a display luminance of the live view image.

\* \* \* \* \*